United States Patent
Yang et al.

(10) Patent No.: US 8,989,049 B2
(45) Date of Patent: Mar. 24, 2015

(54) SYSTEM AND METHOD FOR VIRTUAL PORTCHANNEL LOAD BALANCING IN A TRILL NETWORK

(75) Inventors: Yibin Yang, San Jose, CA (US); Alex Tsai, Cupertino, CA (US); Rajagopalan Janakiraman, Cupertino, CA (US); Vinay V. Parameswarannair, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 13/524,565

(22) Filed: Jun. 15, 2012

(65) Prior Publication Data
US 2013/0336164 A1   Dec. 19, 2013

(51) Int. Cl.
*H04L 12/56* (2006.01)
*H04L 12/26* (2006.01)
*H04L 12/709* (2013.01)
*H04L 12/803* (2013.01)
*H04L 12/46* (2006.01)

(52) U.S. Cl.
CPC .............. *H04L 45/245* (2013.01); *H04L 12/462* (2013.01); *H04L 47/125* (2013.01)
USPC ............ 370/255; 370/221; 370/392; 370/235

(58) Field of Classification Search
USPC ................. 370/221, 252, 335, 342, 392, 235; 455/458
See application file for complete search history.

(56) References Cited

U.S. PATENT DOCUMENTS

| | | | |
|---|---|---|---|
| 8,369,335 B2 * | 2/2013 | Jha et al. | 370/392 |
| 2010/0265849 A1 * | 10/2010 | Harel | 370/256 |
| 2011/0273990 A1 | 11/2011 | Rajagopalan et al. | |
| 2012/0163164 A1 * | 6/2012 | Terry et al. | 370/221 |

OTHER PUBLICATIONS

Cisco, At-A-Glance Brochure, "Cisco Fabric Path," 2010, 2 pages; http://www.cisco.com/en/US/prod/collateral/switches/ps9441/ps9402/at_a_glance_c45-605626.pdf.
Cisco, Design Guide, "Cisco FabricPath Design Guide: Using FabricPath with an Aggregation and Access Topology," 2011, 53 pages; http://www.cisco.com/en/US/prod/collateral/switches/ps9441/ps9670/guide_c07-690079.pdf.
Cisco, Guide, "Intermediate System-to-Intermediate System (IS-IS) TLVs, Document ID 5739," updated Aug. 10, 2005, 7 pages; http://www.cisco.com/image/gif/paws/5739/tivs_5739.pdf.

(Continued)

*Primary Examiner* — Edan Orgad
*Assistant Examiner* — Sithu Ko
(74) *Attorney, Agent, or Firm* — Patent Capital Group

(57) ABSTRACT

An example method includes storing a portion of virtual PortChannel (vPC) information in a TRansparent Interconnect of Lots of Links network environment, deriving, from the portion of vPC information, a physical nickname of an edge switch to which a frame can be forwarded, and rewriting an egress nickname in a TRILL header of the frame with the physical nickname. In example embodiments, the vPC information can include respective vPC virtual nicknames, EtherChannel hash algorithms, hash values, and physical nicknames of edge switches associated with vPCs in the network environment. In some embodiments, the portion of vPC information can be derived from an Interested vPC Type Length Value (TLV) information of an Intermediate System to Intermediate System (IS-IS) routing protocol data unit (PDU).

20 Claims, 10 Drawing Sheets

(56) References Cited

OTHER PUBLICATIONS

Cisco, White Paper, "Cisco FabricPath for Cisco Nexus 7000 Series Switches," Sep, 7, 2011, 44 pages; http://www.cisco.com/en/US/prod/collateral/switches/ps9441/ps9402/white_paper_c11-687554.pdf.

Eastlake, et al., "Proposed Standard, RBridges: TRILL Header Options," TRILL Working Group Internet-Draft, Dec. 24, 2009, 18 pages; http://tools.ietf.org/html/draft-ietf-trill-rbridge-options-00.

Eastlake, et al., "Proposed Standard, RBridges: Further TRILL Header Options," TRILL Working Group Internet Draft, Dec. 1, 2011, 20 pages; http://tools.ietf.org/html/draft-ietf-trill-rbridge-options-06.

Eastlake, et al., "Transparent Interconnection of Lots of Links (TRILL) Use of IS-IS," RFC 6326, Jul. 2011, 26 pages; http://tools.ietf.org/html/rfc6326.

Eastlake, et al., "Routing Bridges (RBridges): Adjacency,"RFC 6327, Jul. 2011, 27 pages; http://tools.ietf.org/html/rfc6327.

Leiserson, Charles E., "Fat-Trees: Universal Networks for Hardware-Efficient Supercomputing," IEEE Transactions on Computers, vol. c-34, No. 10, Oct. 1985, 10 pages; http://courses.csail.mit.edu/6.896/spring04/handouts/papers/fat_trees.pdf.

Perlman, et al., "Introduction to TRILL," The Internet Protocol Journal, vol. 14, No. 3, Sep. 2011, 19 pages; http://www.cisco.com/web/about/ac123/ac147/archived_issues/ipj_14-3/143_trill.html.

Perlman, et al., "Routing Bridges (RBridges): Base Protocol Specification," RFC 6325, Jul. 2011, 100 pages; http://tools.ietf.org/html/rfc6325.

Touch et al., "Transparent Interconnection of Lots of Links (TRILL): Problem and Applicability Statement," RFC 5556, May 2009, 18 pages; http://tools.ietf.org/html/rfc5556.

* cited by examiner

SYSTEM AND METHOD FOR VIRTUAL PORTCHANNEL LOAD BALANCING IN A TRILL NETWORK

TECHNICAL FIELD

This disclosure relates in general to the field of communications and, more particularly, to a system and a method for virtual PortChannel load balancing in a TRansparent Interconnect of Lots of Links (TRILL) network.

BACKGROUND

The field of communications has become increasingly important in today's society. One area of importance associated with network communications relates to load balancing. As traffic and subscriber base of end users increases, so too does the importance of efficient management of workload in networks. Load balancing mechanisms distribute workload across multiple network links, computers, and other resources to achieve desired resource utilization and throughput while avoiding overload and long response times. In particular, load balancing mechanisms may be implemented in TRansparent Interconnect of Lots of Links (TRILL) networks. TRILL applies network layer routing protocols to the link layer and uses that information to support Layer 2 multipathing, thus enabling multi-hop Fiber Channel over Ethernet (FCoE), reducing latency and improving overall network bandwidth utilization, among other features.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11 is a simplified flow diagram illustrating yet other example operational activities that may be associated with embodiments of communication system.

DETAILED DESCRIPTION OF EXAMPLE EMBODIMENTS

Overview

An example method includes storing a portion of virtual PortChannel (vPC) information in a TRansparent Interconnect of Lots of Links (TRILL) network environment, deriving, from the portion of vPC information, a physical nickname of an edge switch to which a frame can be forwarded, and rewriting an egress nickname in a TRILL header of the frame with the physical nickname. In example embodiments, the vPC information can include respective vPC virtual nicknames, EtherChannel hash algorithms, responsible hash values, and physical nicknames of edge switches associated with vPCs in the network environment. In particular embodiments, the egress nickname can be a vPC virtual nickname, or a distribution tree nickname.

In some embodiments, the portion of vPC information can be derived from an Interested vPC Type Length Value (TLV) information of an Intermediate System to Intermediate System (IS-IS) routing protocol data unit (PDU). The method may further include advertising vPC reachability in a vPC Reachability TLV information in another IS-IS routing PDU, the vPC reachability being indicative of vPCs represented by the portion of vPC information.

In specific embodiments, the frame may not be forwarded on a link if a VLAN associated with the frame is only interested in by a portion of vPCs in the network environment, the portion of vPCs being downstream from the link, associated with edge switches downstream from the link, and represented in the portion of vPC information, and the edge switches downstream from the link are not responsible for the frame's hash values. In some example embodiments, the vPC information can include an aggregated vPC virtual nickname representing a plurality of vPCs that anchor on a common set of anchoring edge switches, and use a common EtherChannel hash algorithm, with each anchoring edge switch being responsible for a common subset of hash values associated with the plurality of vPCs.

In example embodiments, the method may further include receiving the frame at an edge switch having the physical nickname, obtaining a hash value of the frame, determining if the edge switch is responsible for the hash value, and forwarding the frame to a vPC anchored on the edge switch, dropping the frame, sending the frame to a spine switch determined from a lookup result, or sending the frame to a spine switch selected from a distribution tree. In specific embodiments, the TRILL network environment may have a fat-tree network topology, with spine switches connected to edge switches that are anchored by vPCs. In other embodiments, the TRILL network environment may have a hub-and-spoke network topology, with hub switches connected to spoke switches that are anchored by vPCs.

Example Embodiments

Figure 1:
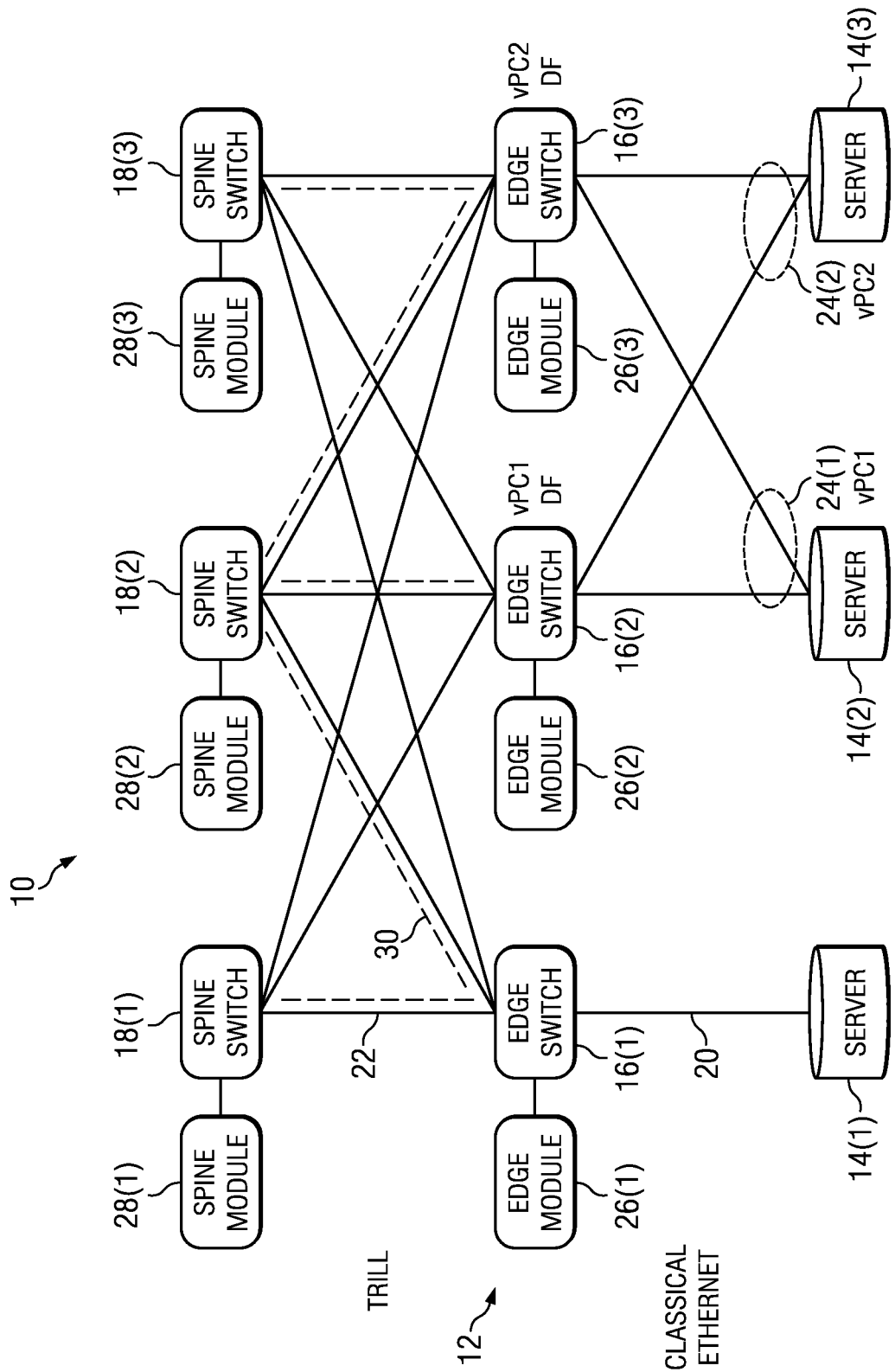
FIG. 1 is a simplified block diagram illustrating a communication system for virtual PortChannel load balancing in a TRILL network.

Turning to FIG. 1, FIG. 1 is a simplified block diagram illustrating a communication system 10 for virtual PortChannel load balancing in a TRILL network in accordance with one example embodiment. Communication system 10 includes TRILL network 12, comprising servers 14(1)-14(3), edge switches 16(1)-16(3) and spine switches 18(1)-18(3). Servers 14(1)-14(3) may communicate with edge switches 16(1)-16(3) over classical Ethernet links 20 (e.g., links that utilize Ethernet protocols such as Link Aggregation Control Protocol (LACP)), or vPC 24(1)-24(2), and edge switches 16(1)-16(3) may communicate with spine switches 18(1)-18(3) via TRILL links 22 (e.g., links that utilize TRILL protocols).

As used herein, a "link" can include a communication channel that connects two or more communicating network elements. The term "network element" encompasses computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Additionally, edge switches 16(1)-16(3) and spine switches 18(1)-18(3) may be included in one or more distribution tree 30 for multi-destination frame forwarding. For example, distribution tree 30 illustrated in the FIGURE is rooted at spine switch 18(2). As used herein, the term "frame" can include messages in Layer 2 of the Open Systems Interconnection (OSI) model. Ethernet links 20 may be bundled together into one or more virtual PortChannels (vPCs) 24(1) and 24(2). As used herein, "vPC" can include EtherChannel, IEEE 802.3ad, and similar mechanisms for aggregating multiple physical network connections (e.g., Ethernet links) to create a single logical network connection via suitable protocols such as Link Aggregation Control Protocol (LACP) and Port Aggregation Control Protocol (PAgP).

vPC allows a single device to use an EtherChannel across two upstream devices. For example, server 14(2) may use vPC 24(1) across edge switch 16(2) and edge switch 16(3). Likewise, server 14(3) may use vPC 24(2) across edge switch 16(2) and edge switch 16(3). In vPC topologies, such as illustrated in the FIGURE, a switch (e.g., edge switch 16(2)) connected to the vPC (e.g., vPC 24(1)) may be assigned as a designated forwarder (DF), which can be responsible for forwarding multi-destination packets for an associated vPC (e.g., vPC 24(1)). For example, edge switches 16(2) and 16(3) can be chosen as vPC DFs for vPC 24(1) and vPC 24(2), respectively. In various embodiments, edge switches 16(1)-16(3) may forward information regarding their local vPCs (e.g., 24(1)-24(2)) whose member ports anchor on them. Additionally, edge switches 16(1)-16(3) may not send a frame received from one of spine switches 18(1)-18(3) back to other spine switches.

According to embodiments of communication system 10, edge switches 16(1)-16(3) may be provisioned with edge modules 26(1)-26(3), respectively. Spine switches 18(1)-18(3) may be provisioned with spine modules 28(1)-28(3), respectively. Edge modules 26(1)-26(3) and spine modules 28(1)-28(3) may facilitate a hash based forwarding scheme. Users may configure per vPC load balancing EtherChannel hash algorithm for traffic going to the associated server. For example, a user may configure destination Internet Protocol (IP) address hash on vPC 24(1) and destination MAC address hash on vPC 24(2). Edge switches 16(1)-16(3) with member ports of the same vPC may be responsible for disjoint subsets of vPC hash values. For example, for vPC 24(1) with an 8-way EtherChannel hash algorithm, edge switch 16(2) may be responsible for hash values 0-3 and edge switch 16(3) may be responsible for hash values 4-7.

As used herein, the term "EtherChannel hash algorithm" can include hash algorithms that are typically used in EtherChannels (e.g., vPCs, IEEE 803.2ad, etc.) to select a port from among multiple ports. EtherChannel hash algorithms may be deterministic, for example, with a set of inputs (such as Transmission Control Protocol ports and source address) consistently resulting in the same port selection. Embodiments of communication system 10 may implement the vPC hash based forwarding for unicast and multi-destination traffic to enable load balancing in TRILL network 12, with vPC pruning to reduce unnecessary flooding and vPC virtual nickname aggregation to allow better scalability.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

The advent of data center networking heralds a new era in the networking industry. The data center network is typically physically collocated and under a single administrative domain. Unlike traditional enterprise networks, a majority of traffic in the data center network is east-west, i.e. between servers within the data center, rather than north-south, i.e. between servers within the data center and the outside. The equipment in the data center tends to be homogenized (e.g., servers, networking gear, network interface cards, storage, connectivity, etc.). In terms of server ports, data center networks can range anywhere from 3000 ports to upwards of 100,000 ports. Data center networks are also more cost sensitive, and not as feature rich as traditional enterprise networks.

Data center networks may comprise various network topologies. One such network topology is a hub-and-spoke topology, in which all traffic moves along spokes connected to a hub at the center. Substantially all traffic passing through the network may traverse the center hub. The nodes in the network can be switches, routers, and other network elements. Another network topology is based on a two-tier, "fat-tree," also known as Clos topology. The fat-tree routing network is based on a complete binary tree. A set of processors is located at the 'leaves' of the fat-tree. Each 'edge' of the fat-tree corresponds to two channels: one channel from parent to child; and another channel from child to parent. The channel leaving the root of the fat-tree corresponds to an interface with an external network. Each internal node of the fat-tree contains circuitry that switches packets between incoming channels and outgoing channels. An implementation of the fat-tree topology comprises a set of edge switches connected to a set of spine switches in a full bipartite graph (i.e., each edge switch is connected to each spine switch and vice versa.

To facilitate interoperability, TRILL protocols may be used in fat-tree networks. The TRILL network presents a solution for shortest-path frame forwarding in multi-hop IEEE 802.1-compliant Ethernet networks with arbitrary topologies (including fat-tree topology), using an existing link-state routing protocol, such as IS-IS protocol. TRILL provides a new architecture of Layer 2 forwarding that enjoys benefits such as pair-wise optimal forwarding, loop mitigation, multi-pathing and provisioning free. Additionally, TRILL can support Layer 2 features, such as Virtual Local-Area Networks (VLANs), auto configuration, and multicast/broadcast with no additional protocol.

Devices implementing TRILL (called "RBridges") run a link state routing protocol (such as IS-IS protocol), which gives each of them knowledge of the topology consisting of all the RBridges and all the links between RBridges. The link state protocol is a routing protocol in which each router determines who its neighbors are, and broadcasts to the other routers a packet with information such as its identity, and neighbors. The broadcast information is stored in a Link State Protocol (LSP) database. Each RBridge chooses a nickname at random, avoiding nicknames already acquired by other RBridges, for example, as discovered by examining the LSP database. As used herein, the term "nickname" of a network element can include a descriptive name of the network element. The nickname can be any arbitrary name. For example, a dynamic nickname acquisition protocol is run among the RBridges to select 2-octet nicknames for RBridges, which may be an abbreviation for a 6-octet IS-IS system ID of the RBridge.

Using the link state routing protocol, each RBridge calculates shortest paths from itself to each other RBridge, as well as trees for delivering multi-destination traffic. When an RBridge, R1, receives an Ethernet frame from a source (e.g., an end node) S, addressed to Ethernet destination D, R1 encapsulates the frame in a TRILL header, addressing the packet to RBridge R2, to which D is attached. The TRILL header contains an "Ingress RBridge" field (R1), an "Egress RBridge" field (R2), and a hop count. When RBridge R2 receives the encapsulated packet, RBridge R2 removes the TRILL header and forwards the Ethernet packet on to destination D. Fields in the TRILL header include: Ingress RBridge nickname (16 bits), and Egress RBridge nickname (16 bits).

RBridge R1 knows that RBridge R2 is the correct egress RBridge for destination D by learning a correspondence between Ingress RBridge R1 and source MAC address of end node S when egress RBridge R2 decapsulates the packet. If RBridge R1 does not know where the destination MAC address is located, RBridge R1 encapsulates the packet in a TRILL header with the multi-destination flag set, indicating that it should be transmitted through a tree to all the RBridges. Another mechanism known as End-Station Address Distribution Information (ESADI) allows RBridge R1 to announce some or all of the end nodes that are attached to RBridge R1. Yet another mechanism is to have a directory that lists not only RBridge nickname, and corresponding set of attached end-node MAC addresses, but also end-node IP address, and corresponding end-node MAC address pairs. The Ingress RBridge (e.g., RBridge R1), (or a hypervisor, or the end-node process itself), might query the directory about the destination, and encapsulate packets accordingly.

In particular, routing information is carried in the IS-IS protocol using type-length-value (TLV) formats in IS-IS protocol data units (PDUs). As used herein, the term "protocol data unit" can include information that is delivered as a unit (e.g., frame) among peer entities of a network (e.g., 12) and that may contain control information. The PDU may be a unit of data communicated alone or appended to other frames among the various network elements. The TLVs make IS-IS extendable, allowing IS-IS to carry different kinds of information in the LSPs. In the IS-IS PDU, there is a fixed and a variable part of the header.

The fixed part of the header contains fields that are generally always present, and the variable part of the header contains TLV that permit flexible encoding of parameters within link state records. These variable fields are identified by one octet of type (T), one octet of length (L) and "L" octets of value (V). The Type field indicates the type of items in the Value field. The Length field indicates the length of the Value field. The Value field is the data portion of the packet. Not all router implementations may support all TLVs, but they are typically required to ignore and retransmit the ignored types. Definitions for various IS-IS PDU types and valid code values have been established in ISO 10589 (defines type codes 1 through 10) and Request For Comments (RFC) 1195 (defines type codes 128 through 133).

RBridges can receive four types of frames: known unicast (e.g., RBridge knows the destination device); unknown unicast (e.g., RBridge does not know the destination device); multicast (e.g., frames with multiple destinations); and broadcast (e.g., frames destined to substantially all members of the network). If the frame is a known unicast, the Ingress RBrigde sends the frame to the Egress RBridge along the shortest path route. If the frame is a broadcast, the Ingress RBridge sends the frame to all devices on the network. On the other hand, if the frame is a multicast, or an unknown unicast, the Ingress RBridge sends the frame to every local area network (LAN) over a distribution tree. The distribution tree can be a minimal spanning tree over the network topology. The distribution tree can be calculated as a tree of shortest paths from a given root, with a deterministic tie-breaker so that all RBridges calculate the same distribution tree. The root can be an RBridge, for example, that is particularly well-situated in the topology such that its tree forms good (e.g., short) paths for all pairs of nodes. Traffic can be load balanced over different distribution trees. RBridge R1 sets the "multi-destination" flag and specifies the tree root nickname in the "egress RBridge" field in the TRILL header when encapsulating the multi-destination frame.

TRILL can be employed in VLANs, which partition end nodes sharing the same infrastructure (e.g., links and bridges) into distinct groups called VLANs, such that end nodes in the same VLAN can talk directly to each other (e.g., using Ethernet), whereas those in different VLANs have to communicate through a router. Typically, an RBridge is configured with a VLAN for each port, and the RBridge adds a tag to the Ethernet header that indicates which VLAN the packet belongs to. RBridges announce (in their LSPs) to which VLANs they are attached. A multi-destination frame will be tagged with the VLAN in the inner header before being sent out. The frame may be delivered to just those RBridges that are connected to a port with end nodes in that VLAN.

Additionally, TRILL provides for Reverse Path Forwarding (RPF) checks. To safeguard against loops, in addition to calculating the subset of ports that belong to a particular distribution tree, the RBridge also calculates, for each port, the set of ingress RBridges whose traffic on that distribution tree should arrive on that port. A multi-destination packets arriving at a port on RBridge R1 may be dropped for one of two reasons: (i) if the port is not included in distribution tree "T1;" or (2) if the port is in distribution tree T1, but RBridge R1 is not listed in the RPF information for that port for distribution tree T1.

When vPCs are used in TRILL networks, EtherChannel polarization may occur, where some member ports are congested while others are underutilized. In traditional EtherChannel networks, load balancing can be achieved through pre-configuration of EtherChannel hash algorithms. However, with vPC in TRILL networks, no such mechanism currently exists to prevent polarization from happening. For example, turning to FIG. 1, assume, merely for the sake of description, and not as a limitation, that traffic from server 14(1) is sent over vPC 24(1) and vPC 24(2) to server 14(2) and server 14(3), respectively. If vPC 24(1) and vPC 24(2) were traditional EtherChannels, they could be configured with EtherChannel hash algorithms to load balance the traffic over their member ports. However, for vPCs in TRILL networks, member port utilization is at the mercy of per switch Equal Cost Multi-Path (ECMP) next-hop hash algorithms, rather than EtherChannel hash algorithms.

Load balancing hashing options for EtherChannel and ECMP differ, and the specific options may be platform dependent. ECMP hash algorithms may be based on Layer 3 information, such as source and destination IP address, protocol, etc. to achieve load balancing. Etherchannel hash algorithms may be deterministic, for example, based on MAC address and session information, and may focus on selecting a particular link in the Etherchannel to carry a frame. The EtherChannel hash algorithm can also use source and destination MAC addresses, or TCP/UDP port numbers, or other parameters. The EtherChannel hash algorithm computes a binary pattern that selects a link number in the bundle to carry the frame. For example, an 8-way EtherChannel hash algorithms compute a value in the range of 0 to 7. With this value as a basis, a particular port in the EtherChannel (e.g., vPC) is chosen.

Assume, merely for the sake of illustration, and not as a limitation, that there are four ECMP paths from server 14(1) to server 14(2) via spine switch 18(2) and spine switch 18(3), and another four from server 14(1) to server 14(3) via spine switch 18(2) and spine switch 18(3) as well. Ideally, for traffic over vPC 24(1) to server 14(2), ECMP hash algorithms on edge switch 16(1), spine switch 18(2) and spine switch 18(3) should make half of the traffic to edge switch 16(2) and another half to edge switch 16(3). The same should hold true for traffic over vPC 24(2) to server 14(3). However, such load balancing is not always achievable as ECMP hash algorithms apply on the flows independent of vPC load balancing. In the worst case, it is possible that load balancing is achieved among edge switch 16(1), spine switch 18(2) and spine switch 18(3) next-hops, but most of the traffic over vPC 24(1) and vPC 24(2) can end up going through edge switch 16(2) and edge switch 16(3), respectively, leading to link utilization polarization.

EtherChannel polarization may persist in multi-destination traffic also. Consider, merely for ease of description, and not as a limitation, multi-destination traffic from server 14(1) to server 14(2) and server 14(3). The traffic may reach both edge switch 16(2) and edge switch 16(3) along distribution tree 30 rooted at spine switch 18(2). To prevent duplication, frames in the multi-destination traffic may be sent to respective servers 14(2) and 14(3) by only one of edge switches 16(1) and 16(2). Moreover, vPC designated forwarder approach allows only one of edge switches 16(1) and 16(2) to send the traffic per vPC 24(1) or 24(2). For example, if edge switch 16(2) is chosen as the DF for vPC 24(1), multi-destination frames to server 14(2) via vPC 24(1) can be sent by edge switch 16(2) only, leading to potential link polarization. Another approach for better load balancing may include using per distribution tree color blocking logic (CBL), allowing load balancing on a VLAN basis. However, the approach is not as flexible as traditional EtherChannel load balancing, and can fail if a single VLAN is used by servers 14(1)-14(3).

Etherchannel load balancing may be implemented through hash-based schemes. Typical schemes may be based on ingress resolution or egress redirect. In the ingress resolution schemes, if an ingress edge switch is aware of the egress vPC's EtherChannel hash algorithm and egress edge switch hash value responsibilities, it can apply the EtherChannel hash algorithm on a frame and based on computed hash value, determine the physical edge switch to use for the egress nickname. A drawback of this approach is scalability. For a large data center deployment, there can be tens of thousands of vPCs in the network. It may be infeasible for an edge switch to store information regarding many vPCs.

In the egress redirect scheme, the ingress edge switch may use a virtual nickname associated with the egress vPC as the egress nickname for a frame. When an egress edge switch not responsible for the frame's hash value receives the frame, it may rewrite the egress nickname with that of the edge switch responsible for the hash value and send the frame back to the spine switch. One of the drawbacks of this approach is suboptimal forwarding. A substantial portion of the network bandwidth may be wasted as a frame may traverse spine switches twice (or more) before reaching its destination.

Communication system 10 is configured to address these issues (and others) in offering a system and method for load balancing in a TRILL network environment. For ease of description, a representative spine switch may be referred to as spine switch 18; a representative edge switch may be referred to as edge switch 16; a representative server may be referred to as server 14, and a representative vPC may be referred to as vPC 24. Spine switches 18(1)-18(3) may store a portion of vPC information, for example, representing vPCs 24(1)-24(2), determine physical nicknames (e.g., RBridge nickname) of edge switches 16(1)-16(3) to which to forward frames based on the portion of the vPC information, and rewrite egress nicknames in TRILL headers of the frames with the physical nicknames.

As used herein, "vPC information" may include vPC virtual nicknames (e.g., nicknames associated with vPCs), EtherChannel hash algorithms, hash values, physical nicknames of edge switches 16(1)-16(3), and such other information associated with substantially all vPCs (e.g., vPCs 24(1)-24(2)) in network 12. In some embodiments, each vPC 24 may have a unique vPC virtual nickname associated therewith. In other embodiments, multiple vPC virtual nicknames may be aggregated into an aggregated vPC virtual nickname.

According to various embodiments, users may configure EtherChannel hash algorithms on vPCs 24(1)-24(2). In one example, EtherChannel hash algorithm may be computed using source or destination MAC addresses, source or destination IP addresses, Layer 4 port numbers, and/or other parameters that can result in a desired level of load balancing in vPCs 24(1)-24(2). The hash values may be allocated across edge switches 16(1)-16(3), for example, according to the vPC configuration. In one embodiment, a portion of the vPC information can be disseminated by edge switches 16(1)-16(3) and stored by spine switches 18(1)-18(3). For example, edge switch 16(2) may advertise information regarding its local vPCs 24(1) and 24(2), including virtual nicknames identifying vPCs 24(1) and 24(2), the load balancing EtherChannel hash algorithms used by the vPCs and the hash values it is responsible for in an "Interested vPCs TLV" of an appropriate TRILL IS-IS PDU. The Interested vPCs TLV may be processed by spine switches 18(1)-18(3), but ignored by edge switches 16(1)-16(3).

The vPC information may be stored in hardware tables in spine modules 28(1)-28(3). In various embodiments, spine switches 18(1)-18(3) may store, in aggregate, information regarding substantially all vPCs (e.g., vPC 24(1)-24(2)), even if each one of spine switches 18(1)-18(3) stores only a portion of vPC information. Each spine switch 18 may advertise reachability of those vPCs represented by the respective portions of vPC information using the virtual nicknames identifying the corresponding vPCs. As used herein, the term "reachability" of the vPCs can include the ability to reach the vPCs through respective spine switch 18 (or respective edge switch 16, as appropriate) that advertises the particular reachability. For example, spine switch 18(2) may indicate that vPC 24(2) may be reachable via spine switch 18(2). In another example, edge switch 16(2) may indicate that vPCs

24(1) and 24(2) may be reachable via edge switch 16(2). In one embodiment, such reachability information may be provided through a vPC Reachability TLV in a TRILL IS-IS PDU.

The vPC virtual nicknames advertised by spine switches 18(1)-18(3) can serve as leaf nodes in the IS-IS topology and may not be used for RPF check computation. Thus, IS-IS shortest path first (SPF) re-computations may not be triggered when spine switches 18(1)-18(3) start or stop announcing their reachability. Frames egressing on vPCs 24(1)-24(2) may be first forwarded to those spine switches 18(1)-18(3) that have the corresponding portion of the vPC information representing vPCs 24(1)-24(2). Edge switches 16(1)-16(3) may continue to encapsulate frames coming in from vPCs 24(1)-24(2) using their vPC virtual nicknames as ingress nicknames. Edge switches 16(1)-16(3) may also continue to use other standard TLVs, such as Affinity TLV, to advertise distribution tree and virtual nickname associations for RPF check computation. In some embodiments, edge switches 16(1)-16(3) may not advertise connectivity to emulated switches (e.g., vPC+) representing vPCs.

Upon receiving a frame whose egress nickname can be found in the hardware tables, appropriate spine switch 18 may apply the EtherChannel hash algorithm specified in the table entry of the portion of vPC information on the frame payload. The physical nickname of appropriate edge switch 16 may be looked up, for example, based on the computed hash value. Then spine switch 18, as appropriate, may rewrite the frame's egress nickname with the edge switch physical nickname and forward the frame based on the new egress nickname lookup result.

To facilitate hash based multi-destination forwarding and vPC load balancing, each edge switch 16 may take the following actions based on its hash value responsibility: (i) for a frame coming from spine switches 18(1)-18(3), before sending it over vPC 24(1) or 24(2), the vPC's EtherChannel hash algorithm may be computed on the frame and then the frame may be dropped if the edge switch is not responsible for the computed hash value, for example, to ensure no duplication for multi-destination frames; (ii) for a unicast frame coming from server 14, the frame may be sent to appropriate spine switch 18 based on a lookup result, unless the frame's destination is a local vPC 24 for which edge switch 16 is responsible, for example, to ensure vPC load balancing; and (iii) for a multi-destination frame coming from server 14, the frame may be sent to appropriate spine switch 18 based on a selected distribution tree (e.g., distribution tree 30). In addition, the frame may be sent to local vPC(s) 24 for whose computed hash values edge switch 16 is responsible, for example, to ensure vPC load balancing and prevent frame duplication.

Although a TRILL based two-tier fat tree topology is illustrated in FIG. 1 to explain the embodiments, it may be noted that the embodiments described herein may be applicable to other topologies and networks also, for example, TRILL networks with hub-and-spoke topologies, where vPCs are connected to spokes; Cisco® FabricPath with fat-tree and hub-and-spoke topologies.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of spine switches, edge switches, servers, and vPCs within the broad scope of the present disclosure.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 12 may represent any type of network, including Internet, enterprise networks, cloud networks, etc.

In various embodiments, spine switches 18(1)-18(3) and edge switches 16(1)-16(3) may include any suitable switch, router, or other network element that is configured to receive frames and forward frames in network 12 as described herein. The term "spine" and "edge" are used merely to distinguish between two layers of the fat-tree architecture depicted in FIG. 1, and are not meant to be limitations. In a general sense, an "edge" switch differs from a "spine" switch by being configured to anchor vPCs thereon.

Servers 14(1)-14(3) may include any suitable physical or virtual computer, server, or other network element. In various embodiments, edge modules 26(1)-26(3) and spine modules 28(1)-28(3) may be applications implemented on edge switches 16(1)-16(3) and spine switches 18(1)-18(3), respectively. In some embodiments, edge modules 26(1)-26(3) and spine modules 28(1)-28(3) may be stand-alone applications; in other embodiments edge modules 26(1)-26(3) and spine modules 28(1)-28(3) may be integrated with other applications, for example, on appropriate physical or virtual line cards; in yet other embodiments, edge modules 26(1)-26(3) and spine modules 28(1)-28(3) may be implemented as objects, libraries and other constituent parts of an executable software within edge switches 16(1)-16(3) and spine switches 18(1)-18(3), respectively.

Figure 2:
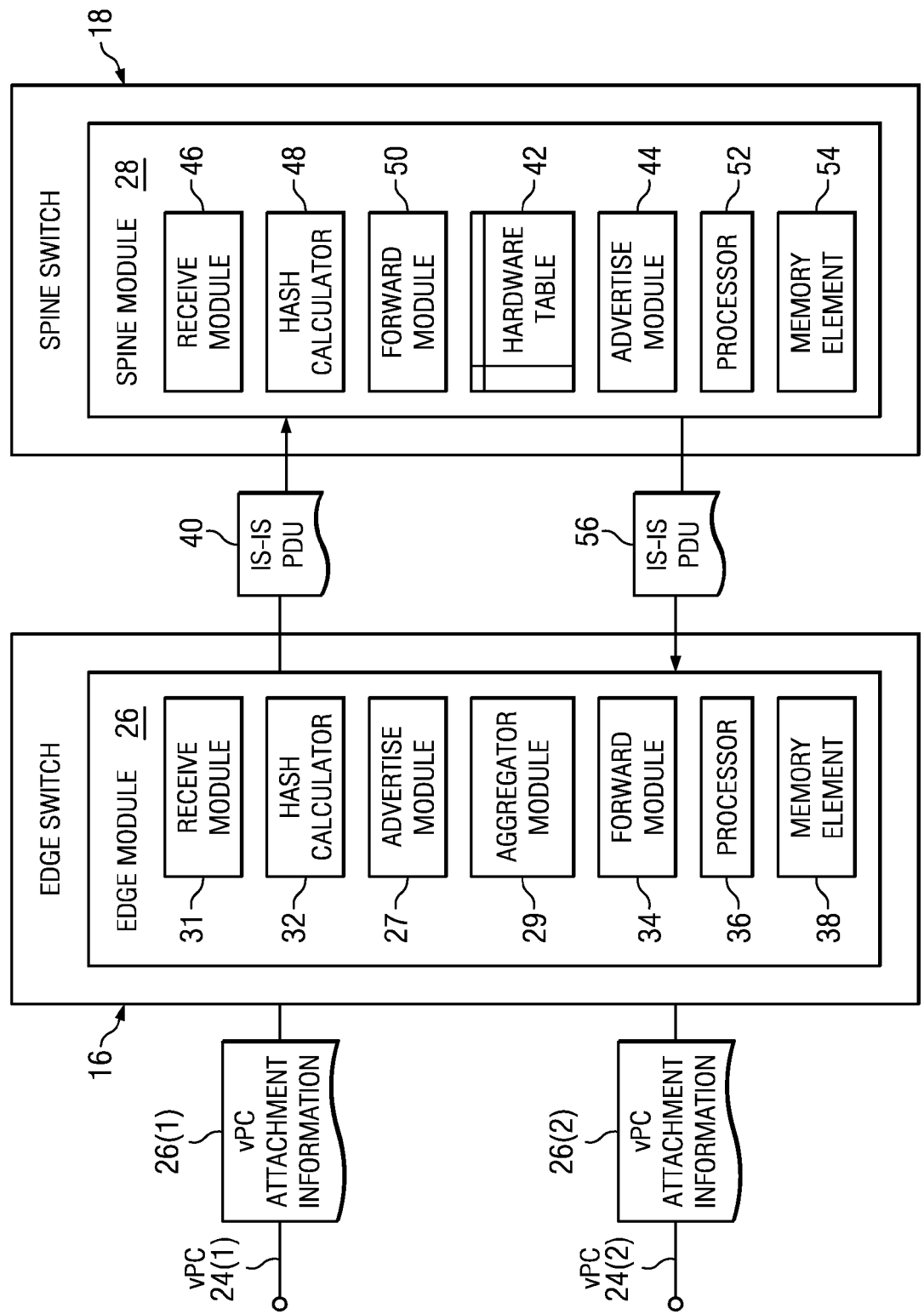
FIG. 2 is a simplified block diagram illustrating example details of the communication system in accordance with one embodiment.

Turning to FIG. 2, FIG. 2 is a simplified block diagram illustrating additional details of communication system 10. Representative edge module 26 may be associated with edge switch 16, which may anchor vPCs 24(1) and 24(2) having respective vPC attachment information 26(1) and 26(2). vPC attachment information 26(1) and 26(2) may each include vPC attachment (e.g., vPC virtual nickname), EtherChannel hash algorithm, and hash values associated with respective vPCs 24(1) and 24(2) for which edge switch 16 is responsible. In one embodiment, a user may configure the EtherChannel hash algorithm based on particular needs. In another embodiment, vPCs 24(1) and 24(2) may be implemented with preconfigured EtherChannel hash algorithms, from which the user chooses a particular EtherChannel hash algorithm. In yet another embodiment, vPCs 24(1) and 24(2) may be implemented with predetermined EtherChannel hash algorithms that may not be amenable to user reconfigurations. Edge module 26 may include an advertise module 27, an aggregate module 29, a receive module 31, a hash calculator 32, a forward module 34, a processor 36, and a memory element 38.

In some embodiments, advertise module 27 may advertise vPC attachment information 26(1) (or 26(2)) through an IS-IS PDU 40, for example, using an Interested vPC TLV header. Separate IS-IS PDUs may be used for each vPCs 24(1) and 24(2). In other embodiments, aggregate module 29 may aggregate vPC attachment information 26(1) and 26(2) into an aggregated nickname and advertise module 27 may advertise the aggregated nickname in IS-IS PDU 40. As a scalability optimization, multiple vPCs 24(1)-24(2) can share a virtual nickname if all of the following three conditions are satisfied: (i) the vPCs anchor on the same set of edge switches; (ii) the vPCs use the same EtherChannel hash algorithm; and (iii) each anchoring edge switch is responsible for the same subset of hash values.

When receive module 31 of edge module 26 receives a frame, hash calculator 32 may perform an EtherChannel hash algorithm on the frame payload according to the EtherChannel hash algorithm in vPC attachment information 26. If the calculated hash value is included in vPC attachment information 26(1) or 26(2), forward module 34 may forward the frame to appropriate vPC 24(1) or 24(2). If the calculated hash value is not included in vPC attachment information 26(1) or 26(2), receive module may check to determine the sender of the frame. If the frame is from spine switch 18, the frame may be dropped (e.g., because edge switch 16 may not be responsible for the hash value). If the frame is from a server (e.g., server 14), forward module 34 may check to determine whether the frame is unicast or multi-destination. If the frame is unicast, forward module 34 may determine appropriate spine switch 18 to which the frame can be forwarded (for example, based on the frame's TRILL header). If the frame is multi-destination, forward module 34 may forward the frame to appropriate spine switch 18 selected from applicable destination tree 30. Edge module 26 may use processor 36 and memory element 38 for performing operations as described herein.

Representative spine module 28 (associated with spine switch 18) may include a hardware table 42, an advertise module 44, a receive module 46, a hash calculator 48, a forward module 50, a processor 52, and a memory element 54. Spine module 28 may aggregate vPC attachment information 26(1) and 26(2) received via IS-IS PDU 40 from a plurality of edge modules (e.g., 26(1)-26(n)) into hardware table 42. Hardware table 42 may include vPC virtual nicknames, EtherChannel hash algorithms, hash values, and physical nicknames of edge switches associated with vPCs in network 12. In some embodiments, hardware table 42 may store vPC information representing substantially all vPCs in network 12. In other embodiments, hardware table 42 may store a portion of vPC information representing a subset of vPCs in network 12. Advertise module 44 may determine the vPCs for which information is stored in hardware table 42, and advertise reachability of those vPCs through a vPC Reachability TLV in an IS-IS PDU 56. Edge module 26 may process IS-IS PDU 56 and route frames accordingly.

Receive module 46 may process a frame received at spine switch 18, for example, by retrieving a vPC virtual nickname from the frame's TRILL header. The frame's TRILL header may include an egress nickname indicating the egress vPC virtual nickname. Hash calculator 48 may lookup hardware table 42 and perform the EtherChannel hash algorithm associated with the vPC virtual nickname, and determine the edge switch physical nickname from the calculated hash value. Forward module 50 may forward the frame to edge switch 16 having the physical nickname. Spine module 28 may use processor 52 and memory element 54 for performing the operations as described herein.

Figure 3:
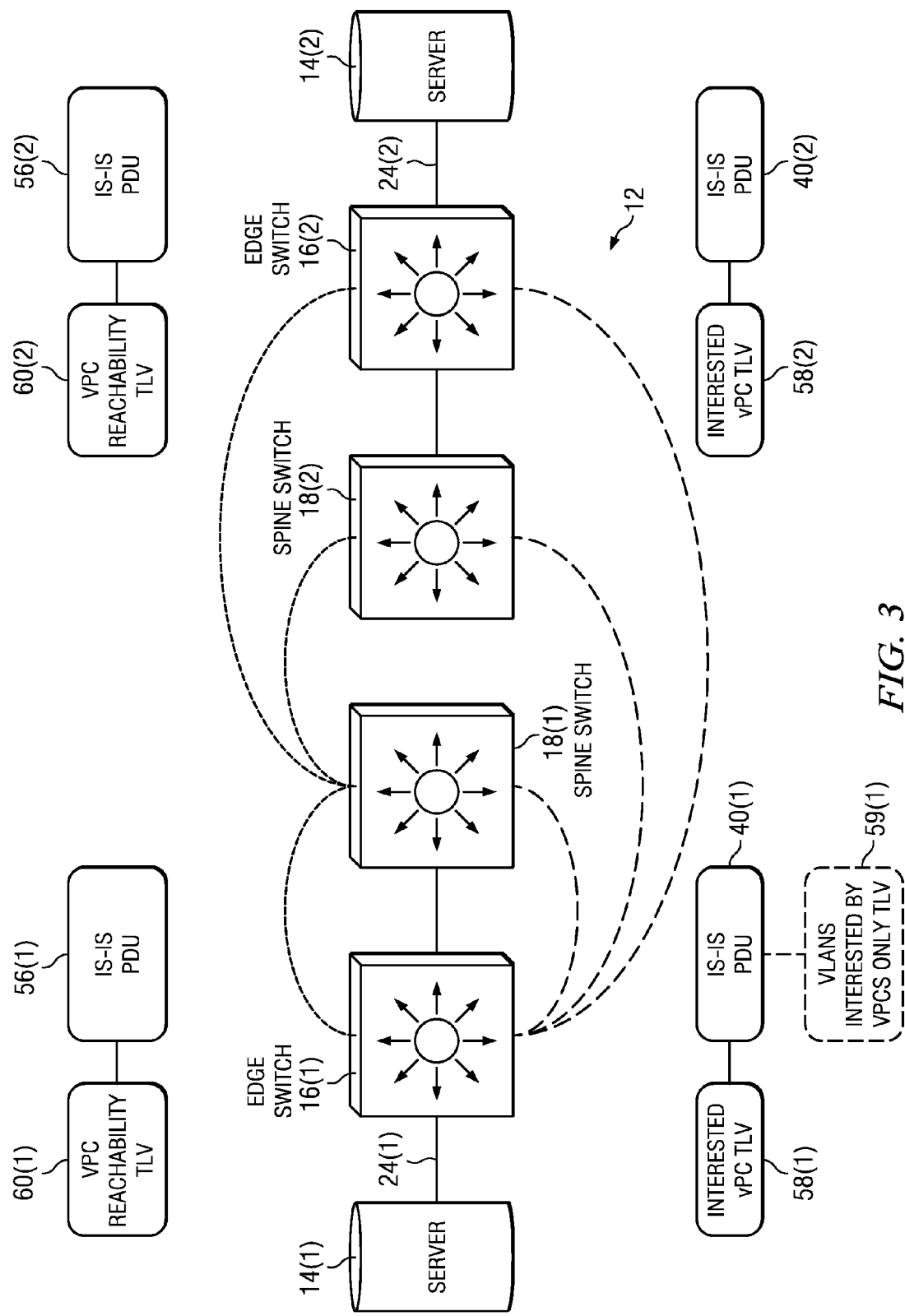
FIG. 3 is a simplified block diagram illustrating other example details of the communication system in accordance with one embodiment.

Turning to FIG. 3, FIG. 3 is a simplified block diagram illustrating details of an embodiment of communication system 10. Server 14(1) may communicate with edge switch 16(1) via vPC 24(1). Edge switch 16(1) may be responsible for certain hash values (e.g., 0-3) of vPC 24(1). Edge switch 16(1) may advertise vPC attachment information associated with vPC 24(1) through an Interested vPC TLV 58(1) in IS-IS PDU 40(1). IS-IS PDU 40(1) may be received by substantially all switches (including spine switches 18(1)-18(2) and edge switch 16(2)) in network 12. Edge switch 16(2) may ignore Interested vPC TLV 58(1), and spine switches 18(1)-18(2) may store information in Interested vPC TLV 58(1) in corresponding hardware tables. For example, spine switch 18(1) may store the information in Interested vPC TLV 58(1), and spine switch 18(2) may not store the information in Interested vPC TLV 58(1). In some embodiments, edge switch 16(1) may also add a VLAN Interested by VPC Only TLV 59(1) to IS-IS PDU 40(1), for example, to indicate the specific VLANs that are interested in by vPC 24(1) only.

Likewise, server 14(2) may communicate with edge switch 16(2) via vPC 24(2). Edge switch 16(2) may be responsible for certain hash values of vPC 24(2). Edge switch 16(2) may advertise vPC attachment information associated with vPC 24(2) through an Interested vPC TLV 58(2) in IS-IS PDU 40(2). IS-IS PDU 40(2) may be received by substantially all switches (including spine switches 18(1)-18(2) and edge switch 16(1)) in network 12. Edge switch 16(1) may ignore Interested vPC TLV 58(2), and spine switches 18(1)-18(2) may store information in Interested vPC TLV 58(2) in corresponding hardware tables. For example, spine switch 18(2) may store the information in Interested vPC TLV 58(2), and spine switch 18(1) may not store the information in Interested vPC TLV 58(2). In another example, both spine switches 18(1) and 18(2) may store the information in Interested vPC TLV 58(2).

Spine switch 18(1) may aggregate such information and store a portion of vPC information representing a subset of vPCs in network 12. For example, spine switch 18(1) may aggregate information from Interested vPC TLV 58(1) and Interested vPC TLV 58(2) in its hardware table. In another example, spine switch 18(1) may store only information in Interested vPC TLV 58(1). Spine switch 18(1) may advertise vPC reachability for the vPCs whose information is stored therein through a vPC Reachability TLV 60(1) in IS-IS PDU 56(1). IS-IS-PDU 56(1) may be received by substantially all switches (including spine switch 18(2) and edge switches 16(1)-16(2)) in network 12. Spine switch 18(2) and edge switches 16(1)-16(2) may store the reachability information in vPC Reachability TLV 60(1) for processing frames.

Likewise, spine switch 18(2) may aggregate information from Interested vPC TLVs 58(1) and 58(2) and store a portion of vPC information representing a subset of vPCs in network 12. For example, spine switch 18(2) may aggregate information from Interested vPC TLV 58(1) and Interested vPC TLV 58(2) in its hardware table. In another example, spine switch 18(2) may store only information in Interested vPC TLV 58(2). Spine switch 18(2) may advertise vPC reachability for the vPCs whose information is stored therein through a vPC Reachability TLV 60(2) in IS-IS PDU 56(2). IS-IS-PDU 56(2) may be received by substantially all switches (including spine switch 18(1) and edge switches 16(1)-16(2)) in network 12. Spine switch 18(1) and edge switches 16(1)-16(2) may store the reachability information in vPC Reachability TLV 60(2) for processing frames.

In some embodiments, IS-IS PDUs 40(1)-40(2), 56(1)-56(2) may be exchanged during configuration of network 12. In other embodiments, IS-IS PDUs 40(1)-40(2), 56(1)-56(2) may be exchanged as and when new vPCs are added to (or removed from) network 12 and anchored on (or disengaged from) appropriate edge switches 16(1) and 16(2). In yet other embodiments, IS-IS PDUs 40(1)-40(2), 56(1)-56(2) may be exchanged whenever any spine switches 18(1)-18(2), edge switches 16(1)-16(2), vPCs 24(1)-24(1), and/or servers 14(1)-14(2) are added to (or removed from) network 12. In yet other embodiments, IS-IS PDUs 40(1)-40(2), 56(1)-56(2) may be exchanged periodically.

When server 14(1) sends a unicast frame destined to server 14(2) through edge switch 16(1), edge switch 16(1) may write the egress vPC virtual nickname in the TRILL header of the frame. Based on the reachability information in vPC Reachability TLV 60(2) (e.g., indicating that vPC 24(2) may be reached through spine switch 18(2)), edge switch 16(2) may determine that the frame may be sent to spine switch 18(2). Spine switch 18(2) may lookup its hardware table and determine the physical nickname of edge switch 16(2) corresponding to the vPC virtual nickname in the frame's TRILL header. Spine switch 18(2) may rewrite the egress nickname to the physical nickname, and forward the frame to edge switch 16(2). Edge switch 16(2) may process the frame and determine that is may be sent to server 14(2) over vPC 24(2).

It may be noted that although embodiments have been described as using IS-IS protocol, other link state routing protocols, such as Open Shortest Path First (OSPF), may also be used suitably, as appropriate, without departing from the scope of the embodiments. Moreover, the mechanisms described herein may be used in conjunction with variations to the protocols, for example, where vPC Reachability TLVs may be announced by edge switches (rather than spine switches). In a heterogeneous environment where both approaches are deployed, some vPCs may be advertised by edge switches via Interested vPCs TLVs while other vPCs may be advised by edge switches via vPC Reachability TLVs. In the former case (where vPCs are advertised by edge switches via Interested vPCs TLVs), vPCs' reachability may be announced by spine switches.

Figure 4:
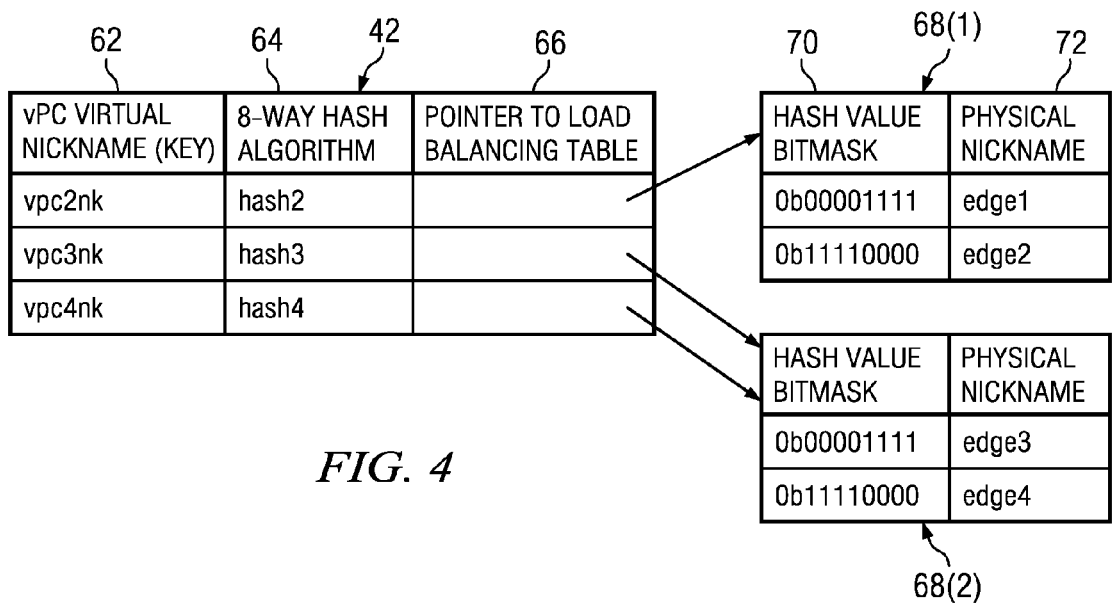
FIG. 4 is a simplified block diagram illustrating yet other example details of the communication system in accordance with one embodiment.

Turning to FIG. 4, FIG. 4 is a simplified diagram illustrating an example hardware table 42 accessed by spine module 28 in spine switch 18. Example hardware table 42 may include a vPC Virtual Nickname field 62, an eight-way EtherChannel hash algorithm field 64, and a pointer to a load balancing table field 66. Load balancing tables 68(1) and 68(2) may include a hash value bitmask field 70 and a physical nickname field 72. vPC Virtual Nickname field 62 may indicate a key to lookup hardware table 42. For example, spine switch 18 may store information representing vPC 24(2) with vPC virtual nickname vpc2nk; vPC 24(3) with vPC virtual nickname vpc3nk; and vPC 24(4) with vPC virtual nickname vpc4nk. Eight-way EtherChannel hash algorithm field 64 may indicate the EtherChannel hash algorithm associated with the respective vPCs. For example, hash2 may be associated with vPC 24(2) with vPC virtual nickname vpc2nk.

When a frame is received at spine switch 18, the frame's TRILL header may indicate a vPC virtual nickname in the egress nickname field. Merely as an example, the vPC virtual nickname may be vpc2nk. Hardware table 42 may indicate that hash2 is the algorithm associated with vpc2nk. Spine module 28 may perform hash2 on the frame payload and calculate a hash value. Pointer to load balancing table field 66 may indicate that load balancing table 68(1) is the appropriate table for vpc2nk. The calculated hash value may be compared with the value in hash value bitmask field 70 of load balancing table 68(1). If the hash value matches, the physical nickname of associated edge switch 16 may be identified at physical nickname field 72. In the example, the physical nickname is edge1, indicating that the destination vPC is associated with edge switch 16(1) having physical nickname edge1. Subsequently, the frame may be forwarded to edge switch 16(1).

In another example, the vPC virtual nickname in the frame may be vpc3nk. Hardware table 42 may indicate that hash3 is the algorithm associated with vpc3nk. Spine module 28 may perform hash3 on the frame payload and calculate a hash value. Pointer to load balancing table field 66 may indicate that load balancing table 68(2) is the appropriate table for vpc3nk. The calculated hash value may be compared with the value in hash value bitmask field 70 of load balancing table 68(2). The physical nickname is edge3, indicating that the destination vPC is associated with edge switch 16(3) having physical nickname edge3. Subsequently, the frame may be forwarded to edge switch 16(3).

Hardware table 42 may be any data structure, organized in any suitable manner to facilitate the operations described herein. The structure illustrated in FIG. 4 is merely one example, and myriad other examples can be implemented in communication system 10 within the broad scope of the embodiments. Hardware table 42 may be stored in any suitable memory element, including databases, storage devices, etc. associated with, or accessible by, spine module 28.

Figure 5:
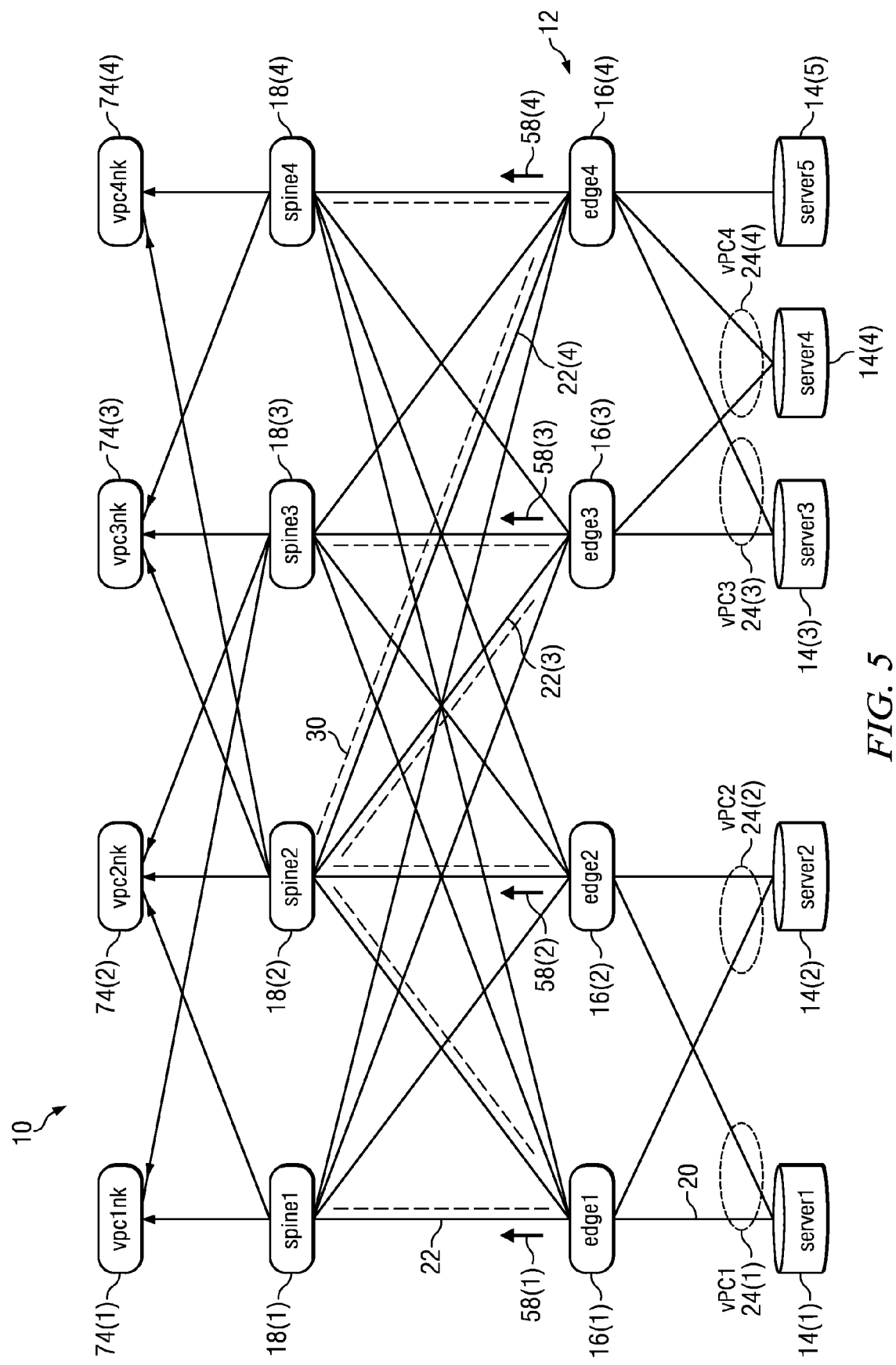
FIG. 5 is a simplified block diagram illustrating another example embodiment of the communication system.

Turning to FIG. 5, FIG. 5 depicts a simplified block diagram illustrating another embodiment of communication system 10. Five servers 14(1)-14(5) may be connected to edge switches 16(1)-16(4), partly via vPCs 24(1)-24(4). Server 14(5) may connect to edge switch 16(4) via a physical link (e.g., that is not bundled with other links). Edge switches 16(1)-16(4) may advertise their local vPC attachments via Interested vPC TLVs 58(1)-58(4). For example, edge switch 16(1) may advertise its local vPCs, vPC 24(1) and vPC 24(2), with vPC virtual nicknames 74(1) (e.g., vpc1nk) and 74(2) (e.g., vpc2nk), respectively in Interested vPC TLV 58(1). Edge switch 16(1) may also announce the EtherChannel hash algorithms associated with vPCs 24(1)-24(2) (e.g., hash1 and hash2), and corresponding responsible hash values, e.g., 0-3 (hash value bitmask 0b00001111). Similar information may be advertised by edge switch 16(2), with responsible hash values of 4-7 (hash value bitmask 0b11110000).

Spine switches 18(1)-18(4) may receive Interested vPC TLVs 58(1)-58(4) and choose (e.g., via provisioning) to store a portion of the vPC information in respective hardware tables. For example, spine switch 18(1) may store information for vPC 24(1) and vPC 24(2), and spine switch 18(2) may store information for vPC 24(2), vPC 24(3) and vPC 24(4). Based on their stored vPC information, spine switches 18(1)-18(4) may advertise reachability of vPCs using vPC virtual nicknames 74(1)-74(4). For example, spine switch 18(2) may use vPC Reachability TLVs to advertise virtual nicknames 74(2) (e.g., vpc2nk), 74(3) (e.g., vpc3nk) and 74(4) (e.g., vpc4nk), corresponding to vPC 24(2), vPC 24(3) and vPC 24(4).

For ease of explanation, and not as a limitation, consider a sequence of frame exchanges between server 14(1) and server 14(3). First, server 14(1) may send a frame with an egress nickname corresponding to server 14(3). Subsequently, lookup may fail on edge switch 16(1) (e.g., edge switch 16(1) may not have as yet learnt the association between vPC virtual nickname 74(3) and server 14(3)), and the frame may be encapsulated using the distribution tree nickname as egress nickname and vpclnk as ingress nickname. The frame may reach both edge switch 16(3) and edge switch 16(4) via distribution tree 30 rooted at spine switch 18(2). Suppose the frame's computed hash values are 2 and 5 for vPC 24(3) and vPC 24(4) EtherChannel hash algorithms, respectively, and edge switch 16(3) and edge switch 16(4) are responsible for hash values 0-3 and 4-7, respectively, for both vPC 24(3) and vPC 24(4). The frame may be sent to server 14(3) by edge switch 16(3) and to server 14(4) by edge switch 16(4), based on their hash value responsibilities. The frame may not be sent to server 14(3) by edge switch 16(4) and to server 14(4) by edge switch 16(3), so that duplication can be avoided. Moreover, the association between vPC virtual nickname 74(1) (e.g., vpclnk) and server 14(1) may be learned by edge switch 16(3) and edge switch 16(4).

Second, server 14(3) may send back a frame to server 14(1), for example, via edge switch 16(4). The lookup on edge switch 16(4) may succeed and the frame may be encapsulated using vPC virtual nickname 74(3) (e.g., vpc3nk) as ingress nickname and vPC virtual nickname 74(1) (e.g., vpclnk) as egress nickname. Since reachability of vPC 24(1) may be advertised by spine switch 18(1) and spine switch 18(3), edge switch 16(4) may have two ECMP paths to choose from, among which the path via spine switch 16(3) may be chosen, as an example. Based on its stored vPC information, spine switch 16(3) may use the EtherChannel hash algorithm (e.g., hash1) corresponding to vPC 24(1) to compute the frame's hash value, say 2. Spine switch 16(3) may rewrite the frame's egress nickname with the responsible edge switch's nickname, for example edge1, corresponding to edge switch 16(1). The rewritten frame may be forwarded to server 14(1) based on the new egress nickname.

In various embodiments, spine switches 18(1)-18(3) may perform pruning based on vPC hash values, in addition to standard VLAN pruning. Representative spine switch 18 may refrain from sending a frame over a link if the following three conditions can be satisfied: (1) the VLAN associated with the frame is only interested in by vPCs 24(1)-24(n) anchored on all edge switches 16(1)-16(m) downstream from the link; (ii) spine switch 18 stores information of all vPCs 24(1)-24(n) downstream from the link; and (iii) downstream edge switches 16(1)-16(m) are not responsible for the frame's hash values computed by using downstream vPCs' EtherChannel hash algorithms.

For ease of illustration, and not as a limitation, assume that "VLAN 100" is interested in by all servers 14(1)-14(5) and advertised via a standard Interested VLAN TLVs by edge switches 16(1)-16(4). Assume that server 14(1) sends a VLAN multi-destination frame, which is received by spine switch 18(2), via TRILL link 22 with edge switch 16(1). The frame can be pruned on a TRILL link 22(3) from spine switch 16(2) to edge switch 16(3) because: VLAN 100 is only interested in by vPCs 24(3) and 24(4), downstream from link 22(3); spine switch 18(2) may store information on vPCs 24(3) and 24(4) downstream from link 22(3); and edge switch 16(3), downstream from link 22(3) is not responsible for the frame's computed hash values corresponding to EtherChannel hash algorithms of vPCs 24(3) and 24(4). A VLAN Interested by vPCs only TLV 59 may be added into TRILL IS-IS, for example, to determine if vPCs are interested in a particular VLAN.

Figure 6:
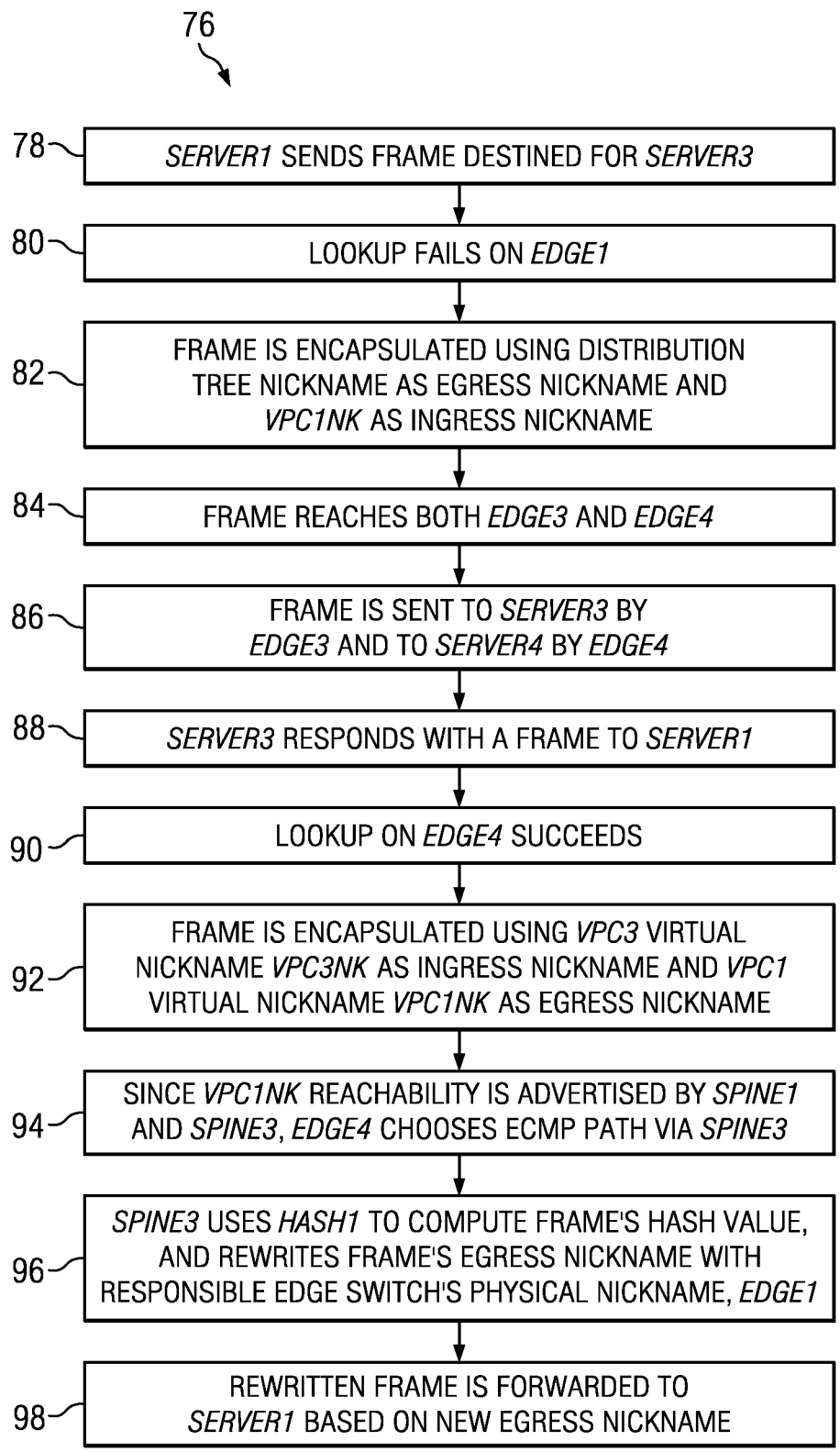
FIG. 6 is a simplified flow diagram illustrating example operational activities that may be associated with embodiments of the communication system.

Turning to FIG. 6, FIG. 6 is a simplified flow diagram illustrating example operations that may be associated with the embodiment of communication system 10 illustrated in FIG. 5. Operations 76 may include 78, at which server 14(1) (e.g., server1) sends a frame destined for server 14(3) (e.g., server3). At 80, lookup may fail on edge switch 16(1) (e.g., edge1). At 82, the frame may be encapsulated using distribution tree nickname as egress nickname and vPC nickname 74(1) (e.g., vpclnk) as ingress nickname. At 84, the frame may reach both edge switch 16(3) (e.g., edge3) and edge switch 16(4) (e.g., edge4). At 86, the frame may be sent to server 14(3) (e.g., server3) by edge switch 16(3) and to server 14(4) (e.g., server4) by edge switch 16(4).

At 88, server 14(3) may respond with a frame to server 14(1). At 90, lookup on edge switch 16(4) may succeed. At 92, the frame may be encapsulated using vPC virtual nickname 74(3) (e.g., vpc3nk) as ingress nickname and vPC virtual nickname 74(1) as egress nickname. At 94, since reachability of vPC 24(1) is advertised by spine switch 18(1) (e.g., spine1) and spine switch 18(3) (e.g., spine3), edge switch 16(4) may choose ECMP path via spine switch 18(3). Spine switch 18(3) may use the EtherChannel hash algorithm associated with vPC 24(1) (e.g., hash1) to compute the frame's hash value, and may rewrite the frame's egress nickname with the responsible edge switch's physical nickname (e.g., edge1), as shown in 96. At 98, the rewritten frame may be forwarded to server 14(1) based on the new egress nickname.

Figure 7:
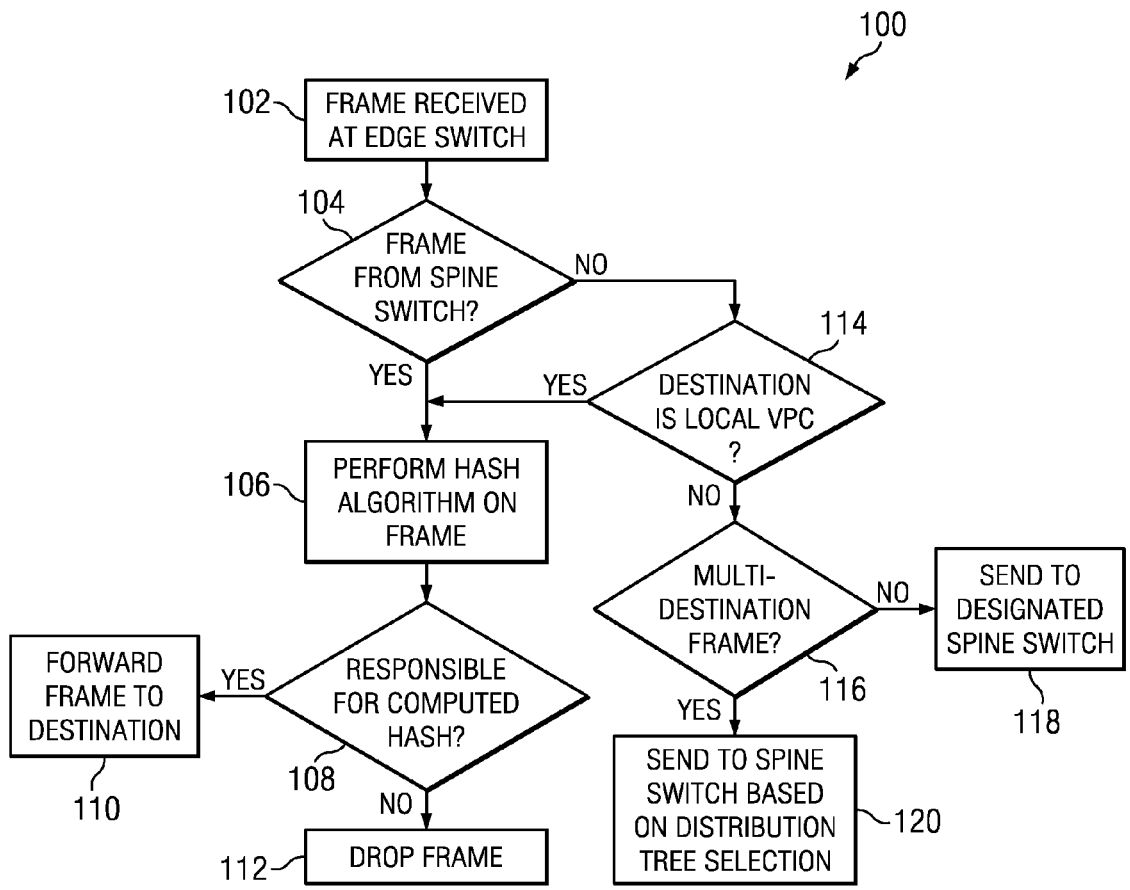
FIG. 7 is a simplified flow diagram illustrating other example operational activities that may be associated with embodiments of communication system.

Turning to FIG. 7, FIG. 7 is a simplified flow diagram illustrating example operations at edge switch 16. Operations 100 may include 102, at which a frame may be received at edge switch 16. At 104, edge switch 16 may determine if the frame is from spine switch 18. If the frame is from spine switch 18, at 106, edge switch 16 may perform an EtherChannel hash algorithm on the frame corresponding to vPCs 24(1)-24(n) anchored thereto. At 108, a determination may be made whether edge switch 16 is responsible for the calculated hash value. If edge switch 16 is responsible, at 110, the frame may be forwarded to its destination via the specified vPC. Otherwise, at 112, the frame may be dropped.

If the frame is not from spine switch 18, a determination may be made at 114 whether the frame is destined to one of local vPCs 24(1)-24(n) anchored on edge switch 16. If the frame is destined to one of local vPCs 24(1)-24(n), the operations may revert to performing an EtherChannel hash algorithm at 106, and following up with associated steps. If the frame is not destined to one of local vPCs 24(1)-24(n), a determination may be made at 116 whether the frame is a unicast frame. If the frame is a unicast frame, the frame may be sent to designated spine switch 18 at 118. In one embodiment, designated spine switch 18 may be determined from information derived from vPC Reachability TLVs and learnt associations between vPCs and servers. If the frame is not a unicast frame (e.g., it is a multi-destination frame), the frame may be sent to spine switch 18 based on distribution tree 30 at 120. Spine switch 18 may thereafter forward the frame along distribution tree 30 to destination servers.

Figure 8:
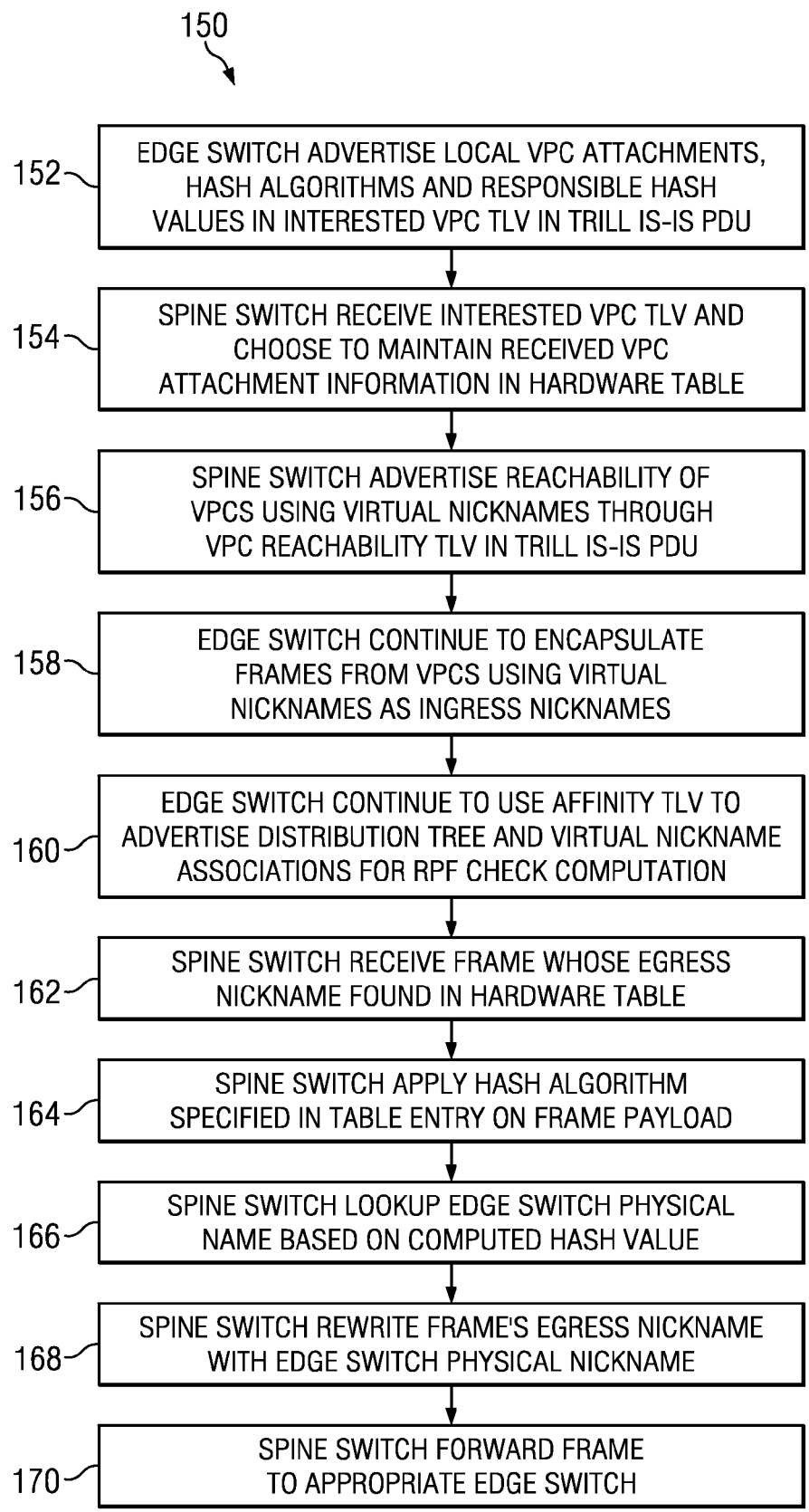
FIG. 8 is a simplified flow diagram illustrating yet other example operational activities that may be associated with embodiments of communication system.

Turning to FIG. 8, FIG. 8 is a simplified flow diagram illustrating example operations that may be associated with an embodiment of communication system 10. Operations 150 may include 152, at which edge switch 16 may advertise local vPC attachments, EtherChannel hash algorithms and responsible hash values in Interested vPC TLV 58 in TRILL IS-IS PDU 40. At 154, spine switch 18 may receive Interested vPC TLV 58 and choose to store received vPC attachment information 26 in hardware table 42. At 156, spine switch 18 may advertise reachability of vPCs for which it stores information using virtual nicknames through vPC Reachability TLVs 60 in TRILL IS-IS PDU 56. At 158, edge switch 16 may continue to encapsulate frames from vPCs using vPC virtual nicknames as ingress nicknames. At 160, edge switch 16 may continue to use Affinity TLVs to advertise distribution tree 30 and virtual nickname associations for RPF check computations.

At 162, spine switch 18 may receive a frame whose egress nickname can be found in hardware table 42. At 164, spine switch 18 may apply the appropriate EtherChannel hash algorithm specified in the table entry on the frame payload. At 166, spine switch 18 may lookup the edge switch physical name based on the computed hash value. At 168, spine switch 168 may rewrite the frame's egress nickname in the TRILL header with the edge switch physical nickname. At 170, spine switch 18 may forward the frame to appropriate edge switch 16.

Figure 9:
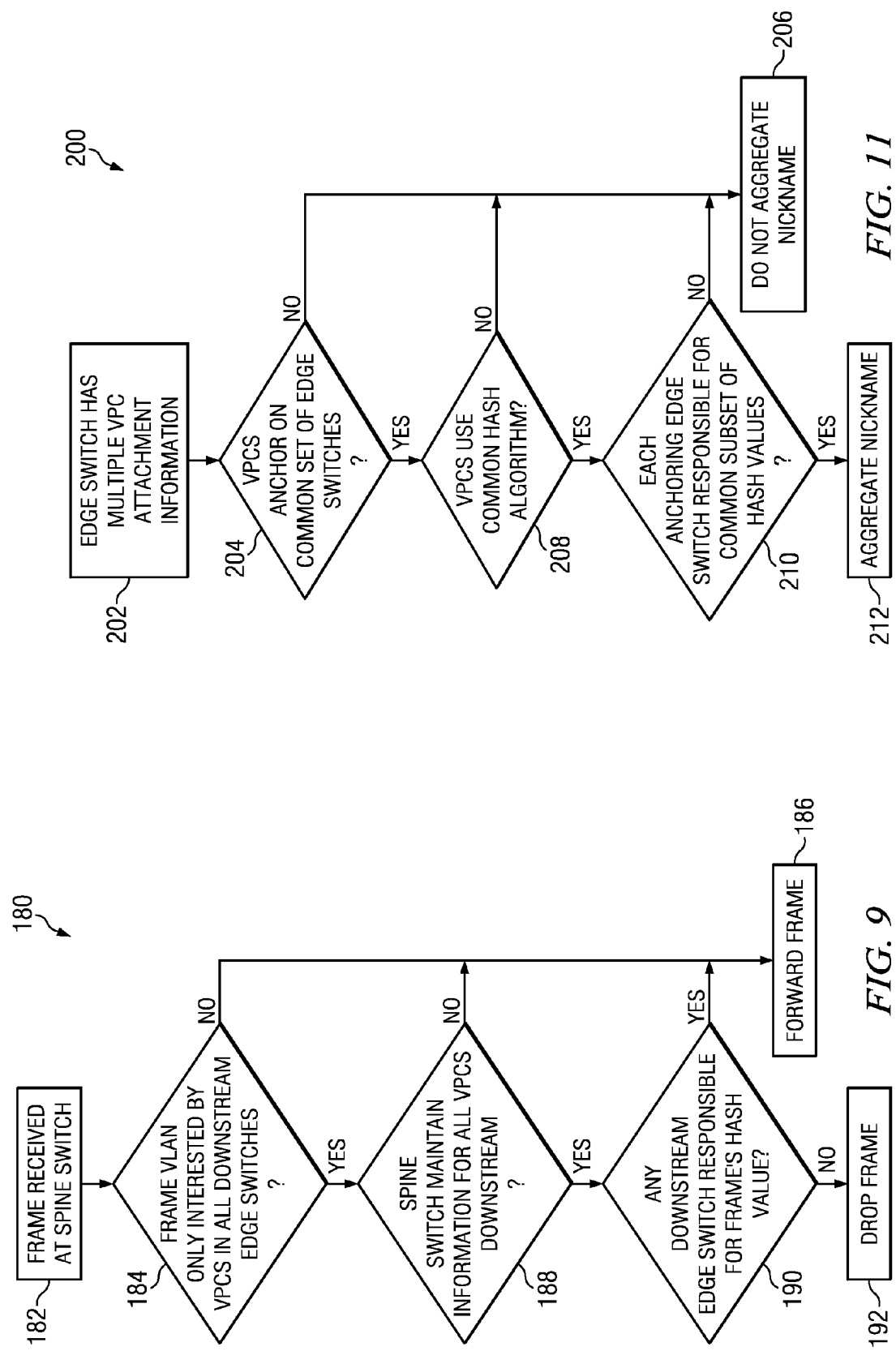
FIG. 9 is a simplified flow diagram illustrating yet other example operational activities that may be associated with embodiments of communication system.

Turning to FIG. 9, FIG. 9 is a simplified flow diagram illustrating example operations that may be associated with vPC pruning in embodiments of communication system 10. Operations 180 include 182, at which a frame is received at spine switch 18. At 184, a determination may be made whether the frame VLAN is only interested in by vPCs 24(1)-24(p) in all downstream edge switches 16(1)-16(m) of TRILL link 22(i) under analysis. If not, the frame may be forwarded to the appropriate destination at 186. If the frame is interested in by vPCs 24(1)-24(p) in all downstream edge switches 16(1)-16(m) of TRILL link 22(i), a determination may be made at 188 if spine switch 18 stores information for all vPCs 24(1)-24(p) downstream of TRILL link 22(i). If not, the frame may be forwarded to the appropriate destination at 186. If spine switch 18 stores information for all vPCs 24(1)-24(p) downstream of TRILL link 22(i), at 190, a determination may be made whether any of downstream edge switches 16(1)-16(m) is responsible for the frame's hash value. If one of downstream edge switches 16(1)-16(m) is responsible for the frame's hash value, the frame may be forwarded to the appropriate destination at 186. If none of downstream edge switches 16(1)-16(m) is responsible for the frame's hash value, the frame may be dropped on TRILL link 22(i) at 192.

Figure 10:
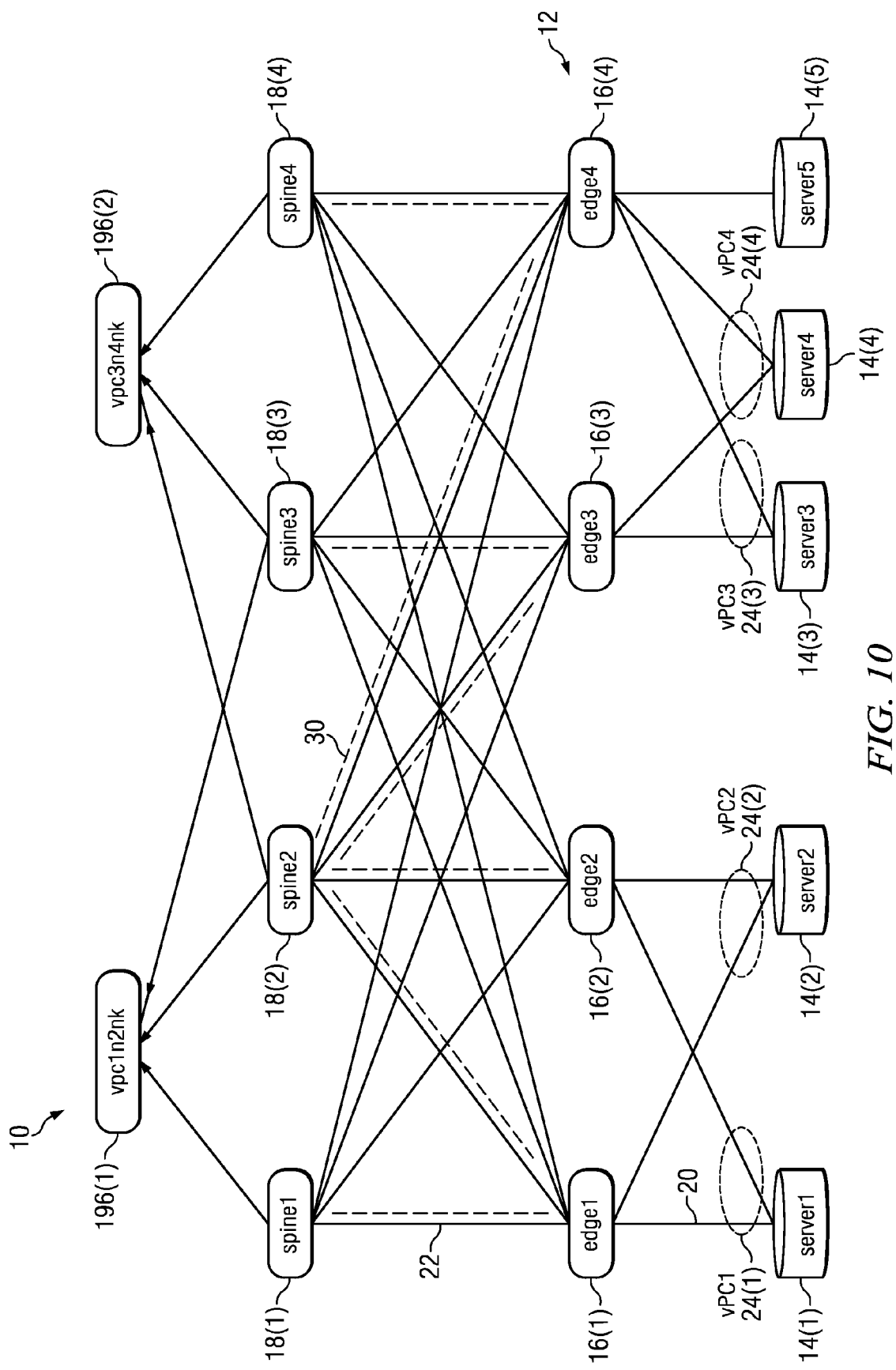
FIG. 10 is a simplified block diagram illustrating yet another example embodiment of the communication system.

Turning to FIG. 10, FIG. 10 is a simplified block diagram illustrating yet another embodiment of communication system 10 to aggregate vPC virtual nicknames. For ease of explanation, only a limited number of network elements are shown in network 12. It may be understood that any number of network elements may be used without departing from the broad scope of the embodiment. Spine switches 18(1)-18(4) may store a limited amount of vPC attachment information, for example, depending on their respective storage space, memory schemes, provisioning, etc. Only a portion of vPC information in network 12 may be stored in each of spine switches 18(1)-18(4). Moreover, spine switches 18(1)-18(3) may not learn server MAC addresses, for example, because vPCs 24(1)-24(4) can be identified by virtual nicknames (e.g., vpc1nk, vpc2nk, etc.)

As a scalability optimization, multiple vPCs 24(1)-24(4) can share a virtual nickname if all of the following three conditions are satisfied: (i) the vPCs anchor on the same set of edge switches; (ii) the vPCs use the same EtherChannel hash algorithm; and (iii) each anchoring edge switch 16(1)-16(4) is responsible for the same subset of hash values. Merely as an example and not as a limitation, consider vPC 24(1) and vPC 24(2) in FIG. 10. vPC 24(1) and vPC 24(2) both anchor on edge switch 16(1) and edge switch 16(2). If vPC 24(1) and vPC 24(2) use the same EtherChannel hash algorithm (e.g., hash1) and edge switch 16(1) and edge switch 16(2) are responsible for the same subsets of hash values, for example, 0-3 and 4-7, respectively, a single virtual nickname 196(1) (e.g., vpcln2nk) can be used instead of two separate nicknames.

Likewise, if vPC 24(3) and vPC 24(4) use the same EtherChannel hash algorithm (e.g., hash3) and edge switch 16(3) and edge switch 16(4) are responsible for the same subsets of hash values, for example, 0-3 and 4-7, respectively, a single virtual nickname 196(2) (e.g., vpc3n4nk) can be used instead of two separate nicknames. The number of virtual nicknames can be consequently reduced by half. To facilitate vPC virtual nickname aggregation, an algorithm for hash value responsibility assignment and a mechanism for hash value responsibility distribution can be configured within communication system 10. Edge switches 16(1)-16(4) may use aggregated nicknames in their advertised Interest vPC TLV and spine switches 18(1)-18(4) may populate their respective hardware tables with aggregated virtual nicknames 196(1) and 196(2) (e.g., just like any other non-aggregated nicknames). Also, spine switches 18(1)-18(4) may transparently advertise aggregated nicknames 196(1) and 196(2) in their respective vPC Reachability TLVs 60(1)-60(4).

Turning to FIG. 11, FIG. 11 illustrates a simplified flow diagram illustrating example operations that may be associated with vPC virtual nickname aggregation. Operations 200 may include 202, at which edge switch 16 may have multiple vPC attachment information 26(1)-26(n) corresponding to vPCs 24(1)-24(n). vPC attachment information 26(1)-26(n) may include respective vPC virtual nicknames 74(1)-74(n). At 204, a determination may be made whether vPCs 24(1)-24(n) anchor on a common set of edge switches 16(1)-16(m). If not, a decision may be made at 206 not to aggregate vPC virtual nicknames 74(1)-74(n).

If vPCs 24(1)-24(n) anchor on a common set of edge switches 16(1)-16(m), a determination may be made at 208 whether vPCs 24(1)-24(n) use a common EtherChannel hash algorithm (e.g., hash1). If not, a decision may be made at 206 not to aggregate vPC virtual nicknames 74(1)-74(n). If vPCs 24(1)-24(n) use a common EtherChannel hash algorithm (e.g., hash1), a determination may be made at 210 whether each one of anchoring edge switches 16(1)-16(m) is responsible for a common subset of hash values (e.g., 0-3, 4-7, etc.). If not, a decision may be made at 206 not to aggregate vPC virtual nicknames 74(1)-74(n). If each one of anchoring edge switches 16(1)-16(m) is responsible for a common subset of hash values, vPC virtual nicknames 74(1)-74(n) may be aggregated into vPC aggregated virtual nickname 196 at 212. When vPC virtual nicknames 74(1)-74(n) are aggregated into vPC aggregated virtual nickname 196, vPC virtual nicknames 74(1)-74(n) may not even be used (e.g., disregarded, not generated, etc.); instead vPC aggregated virtual nickname 196 may be used in corresponding hardware tables, based on particular configuration needs.

Figure 12:
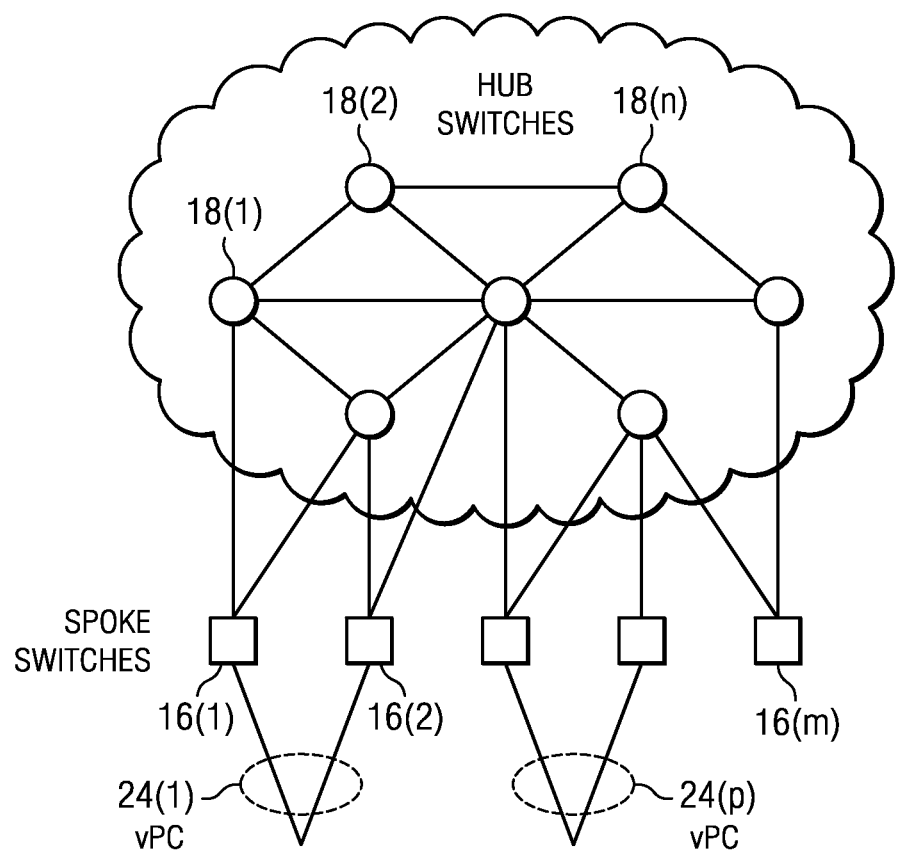
FIG. 12 is a simplified block diagram illustrating yet another example embodiment of the communication system.

Turning to FIG. 12, FIG. 12 is a simplified block diagram illustrating yet another embodiment of communication system 10 in a hub-and-spoke topology. Spine switches 18(1)-18(n) may comprise hub switches in the topology, and edge switches 16(1)-16(m) may comprise spoke switches in the topology, with vPCs 24(1)-24(p) anchoring on edge switches 16(1)-16(m). Spine switches 18(1)-18(n) may, in the aggregate, store vPC information for vPCs 24(1)-24(p), with each spine switch 18 storing a portion of the vPC information.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, edge module 26 and spine module 28. In some embodiments, one or more of these features may be implemented in hardware, provided external to these elements, or consolidated in any appropriate manner to achieve the intended functionality. The various network elements (e.g., edge module 26, spine module 28) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, edge module 26, and spine module 28 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 38, 54) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., 36, 52) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant:

(a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a spine switch in a TRansparent Interconnect of Lots of Links (TRILL) network environment, comprising:
    storing a portion of virtual PortChannel (vPC) information received from edge switches in Interested vPC Type Length Value (TLV) information of Intermediate System to Intermediate System (IS-IS) routing protocol data units (PDUs), wherein the portion of the vPC information received from the edge switches comprises a hash algorithm associated with the edge switches, and disjoint subsets of hash values for which the edge switches are responsible;
    deriving, from the portion of vPC information, a physical nickname of a specific one of the edge switches to which a frame can be forwarded, wherein the deriving comprises computing a hash value for the frame based on the hash algorithm specified by the vPC information, and selecting the specific edge switch based on the computed hash value; and
    rewriting an egress nickname in a TRILL header of the frame with the physical nickname.

2. The method of claim 1, wherein the vPC information includes respective vPC virtual nicknames, EtherChannel hash algorithms, hash values, and physical nicknames of edge switches associated with vPCs in the network environment.

3. The method of claim 1, wherein the egress nickname is a selected one of a vPC virtual nickname and a distribution tree nickname.

4. The method of claim 1, wherein the portion of vPC information is derived from at least one of the Interested vPC Type Length Value (TLV) information from the edge switches and a vPC Reachability TLV information of IS-IS PDUs from other spine switches.

5. The method of claim 1, wherein the frame is not forwarded on a link, and wherein a portion of vPCs are represented in the portion of vPC information.

6. The method of claim 1, wherein the vPC information includes an aggregated vPC virtual nickname representing a plurality of vPCs that anchor on a common set of anchoring edge switches, and each anchoring edge switch is responsible for a common subset of hash values associated with the plurality of vPCs.

7. The method of claim 1, further comprising:
    advertising vPC reachability in a vPC Reachability TLV information of another IS-IS routing PDU, wherein the vPC reachability indicates vPCs represented by the portion of vPC information.

8. The method of claim 1, further comprising:
    receiving the frame at a particular edge switch having the physical nickname;
    obtaining a hash value of a portion of the frame;
    determining if the particular edge switch is responsible for the hash value; and
    performing a selected one of a group of actions, the group consisting of:
        forwarding the frame to a vPC anchored on the particular edge switch,
        dropping the frame,
        sending the frame to a spine switch based on a lookup result, and
        sending the frame to a spine switch selected from a distribution tree.

9. The method of claim 1, further comprising:
    identifying an association between a vPC virtual nickname and a server's Media Access Control (MAC) address, wherein the vPC virtual nickname is associated with a vPC anchored on the server.

10. The method of claim 1, wherein the TRILL network environment comprises a fat-tree network topology, and wherein spine switches are connected to edge switches that are anchored by vPCs.

11. The method of claim 1, wherein the TRILL network environment comprises a hub-and-spoke network topology, and wherein hub switches are connected to spoke switches that are anchored by vPCs.

12. Logic encoded in non-transitory media that includes instructions for execution and when executed by a processor of a spine switch in a TRILL network environment, is operable to perform operations comprising:
    storing a portion of virtual PortChannel (vPC) information received from edge switches in Interested vPC Type Length Value (TLV) information of Intermediate System to Intermediate System (IS-IS) routing protocol data units (PDUs), wherein the portion of the vPC information received from the edge switches comprises a hash algorithm associated with the edge switches, and disjoint subsets of hash values for which the edge switches are responsible;
    deriving, from the portion of vPC information, a physical nickname of a specific one of the edge switches to which a frame can be forwarded, wherein the deriving comprises computing a hash value for the frame based on the hash algorithm specified by the vPC information, and selecting the specific edge switch based on the computed hash value; and
    rewriting an egress nickname in a TRILL header of the frame with the physical nickname.

13. The logic of claim 12, wherein the vPC information includes respective vPC virtual nicknames, EtherChannel hash algorithms, hash values, and physical nicknames of edge switches associated with vPCs in the network environment.

14. The logic of claim 12, the operations further comprising:
    receiving the frame at a particular edge switch having the physical nickname;
    obtaining a hash value of a portion of the frame; and
    determining if the particular edge switch is responsible for the hash value.

15. The logic of claim 12, wherein the frame is not forwarded on a link, and wherein a portion of vPCs are represented in the portion of vPC information.

16. The logic of claim 12, wherein the vPC information includes an aggregated vPC virtual nickname representing a plurality of vPCs that anchor on a common set of anchoring edge switches, and each anchoring edge switch is responsible for a common subset of hash values associated with the plurality of vPCs.

17. An apparatus associated with a spine switch in a TRILL network environment, comprising:
    a memory element for storing data; and
    a processor that executes instructions associated with the data, wherein the processor and the memory element cooperate, such that the apparatus is configured for:
        storing a portion of virtual PortChannel (vPC) information received from edge switches in Interested vPC Type Length Value (TLV) information of Intermediate System to Intermediate System (IS-IS) routing protocol data units (PDUs), wherein the portion of the vPC information received from the edge switches comprises a hash algorithm associated with the edge switches, and disjoint subsets of hash values for which the edge switches are responsible;

deriving, from the portion of vPC information, a physical nickname of a specific one of the edge switches to which a frame can be forwarded, wherein the deriving comprises computing a hash value for the frame based on the hash algorithm specified by the vPC information, and selecting the specific edge switch based on the computed hash value; and rewriting an egress nickname in a TRILL header of the frame with the physical nickname.

18. The apparatus of claim 17, wherein the vPC information includes respective vPC virtual nicknames, EtherChannel hash algorithms, hash values, and physical nicknames of edge switches associated with vPCs in the network environment.

19. The apparatus of claim 17, further configured for:
receiving the frame at a particular edge switch having the physical nickname;
obtaining a hash value of a portion of the frame; and
determining if the particular edge switch is responsible for the hash value.

20. The apparatus of claim 17, wherein the frame is not forwarded on a link, and wherein a portion of vPCs are represented in the portion of vPC information.

* * * * *